United States Patent
Schering

(10) Patent No.: US 8,418,058 B2
(45) Date of Patent: Apr. 9, 2013

(54) GRAPHICAL INDICATION OF SIGNED CONTENT

(75) Inventor: Jeffrey Schering, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 11/958,007

(22) Filed: Dec. 17, 2007

(65) Prior Publication Data

US 2009/0158145 A1 Jun. 18, 2009

(51) Int. Cl.
*G06N 3/00* (2006.01)

(52) U.S. Cl.
USPC .......................................... 715/273; 715/234

(58) Field of Classification Search .................. 715/230, 715/240, 273, 733, 741, 751, 760, 234, 243, 715/254, 255
See application file for complete search history.

(56) References Cited

U.S. PATENT DOCUMENTS

| | | | |
|---|---|---|---|
| 5,448,729 A | 9/1995 | Murdock | |
| 6,671,805 B1 | 12/2003 | Brown et al. | |
| 7,028,072 B1 * | 4/2006 | Kliger et al. | 709/203 |
| 7,406,599 B1 * | 7/2008 | Pravetz et al. | 713/176 |
| 7,840,527 B2 * | 11/2010 | Kahn et al. | 707/608 |
| 2005/0262081 A1 * | 11/2005 | Newman | 707/9 |
| 2006/0168125 A1 * | 7/2006 | Leo Spork | 709/219 |
| 2006/0235984 A1 * | 10/2006 | Kraus et al. | 709/228 |
| 2008/0005284 A1 * | 1/2008 | Ungar et al. | 709/219 |
| 2008/0126944 A1 * | 5/2008 | Curtis et al. | 715/733 |
| 2008/0147824 A1 * | 6/2008 | Hendrey | 709/218 |

* cited by examiner

*Primary Examiner* — Kyle Stork

(74) *Attorney, Agent, or Firm* — Yee & Associates, P.C.; Yeen Tham

(57) ABSTRACT

A computer implemented method, apparatus, and computer program code readily identifies authenticated content within webpage having user customizable content. A request to display a wiki page is received. Responsive to receiving the request, a wiki markup file with a wiki signature block is identified. The wiki markup file contains signed content and unsigned content. The signature block identifies the signed content within the wiki markup file. Signed content is verified and an edited wiki page is generated from the signed content and the unsigned content. Signed content is visibly distinguished from the unsigned content.

20 Claims, 5 Drawing Sheets

GRAPHICAL INDICATION OF SIGNED CONTENT

BACKGROUND OF THE INVENTION

1. Field of the Invention

The present invention relates generally to an improved data processing system and in particular to a computer implemented method, apparatus, and computer program code for readily identifying authenticated content within a web page having user customizable content.

2. Description of the Related Art

A wiki is a type of computer software that allows users to easily create, edit and link documents that can be viewed in a browser. Wikis are often used to create collaborative or community based websites, wherein pages of the wiki are implemented as web pages. Wikis may be installed as a business Intranet to provide affordable and effective knowledge sharing among employees about a particular project or event.

Wiki documents, sometimes referred to as "wiki pages," generally discuss a single topic. The wiki page is typically provided with hypertext links that direct a user to other wiki pages discussing related topics. Thus, the wiki provides an easily augmented and edited database for creating, browsing, and searching information contained in the wiki.

A wiki page is generally created and edited using a simple markup language and accessed through a browser. The wiki page is intentionally easy to use and manipulate such that any user of the wiki can edit information found within the wiki pages. Due to the collaborative nature of the wiki and the ease in which wiki pages are edited, typically no review occurs before modifications are accepted. Consequentially, misleading or incorrect information may sometimes be inadvertently, or maliciously, incorporated into the wiki.

Several efforts have been made to retain the collaborative information sharing benefits of the wiki, while filtering, or disclaiming responsibility for unauthorized information added to the wiki.

A digital signature is a type of asymmetric cryptography used to authenticate digital documents. Each user is provided with a pair of corresponding encryption/decryption algorithm keys: a private key and a public key. The digital signature typically consists of the application of algorithms utilizing the encryption/decryption keys.

A first fingerprint of the digital document is created using a known hash function. A signature creating algorithm S, then utilizes the private key SK to create a digital signature σ based on that first fingerprint. The digital signature σ is created at the time of signing the digital document. The digital signature σ is stored with, or is embedded into, the digital document.

When the digital document is later viewed, a signature verifying algorithm V, utilizes the public key PK to verify the digital signature σ. The known hash function is used to create a second fingerprint of the digital document. The signature verifying algorithm V, then utilizes the public key PK to recreate the first fingerprint from the digital signature σ. The first finger print is then compared to the second fingerprint. If the two fingerprints are identical, then the digital document is accepted as authenticated. If the two fingerprints are disparate, the signature is not authenticated because the document has been changed between the time of signing and the time of viewing.

When digitally signed and unsigned content appear together on a web page or in some other display format, the reader of the content cannot distinguish between the signed and unsigned content. The reader does not know what has been signed and what has not been signed.

Lotus Forms Viewer implements one solution to this problem. A tooltip is displayed to the user when the user mouses over a signed item. However, the user can distinguish between signed and unsigned content only by moving the mouse over each item of information displayed on the screen, while waiting for the tooltip to display. Thus, the implemented solution does not provide an easy way to differentiate the authenticity of the displayed content. Lotus Forms Viewer is available from International Business Machines, Corp. Lotus is a registered trademark of International Business Machines, Corp.

It is an ongoing concern to easily distinguish the official content within a wiki or other customizable delivery format, from content added by unofficial third parties. While digital signatures can provide some measure of differentiation between official and unofficial content, there remains room for improvement. There is no currently available method to easily distinguish authenticated and unauthenticated information within a wiki or web document.

Therefore, it would be advantageous to have a computer implemented method, apparatus, and computer program code to address the above described problems, as well as other problems.

SUMMARY OF THE INVENTION

A computer implemented method, apparatus, and computer program code readily identifies authenticated content within a webpage having user customizable content A request to display a wiki page is received. Responsive to receiving the request, a wiki markup file and a wiki signature block are identified. The wiki markup file contains signed content and unsigned content. The wiki signature block identifies the signed content within the wiki markup file. Signed content is verified, and an edited wiki page is generated from the signed content and the unsigned content. Signed content is visibly distinguished from the unsigned content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
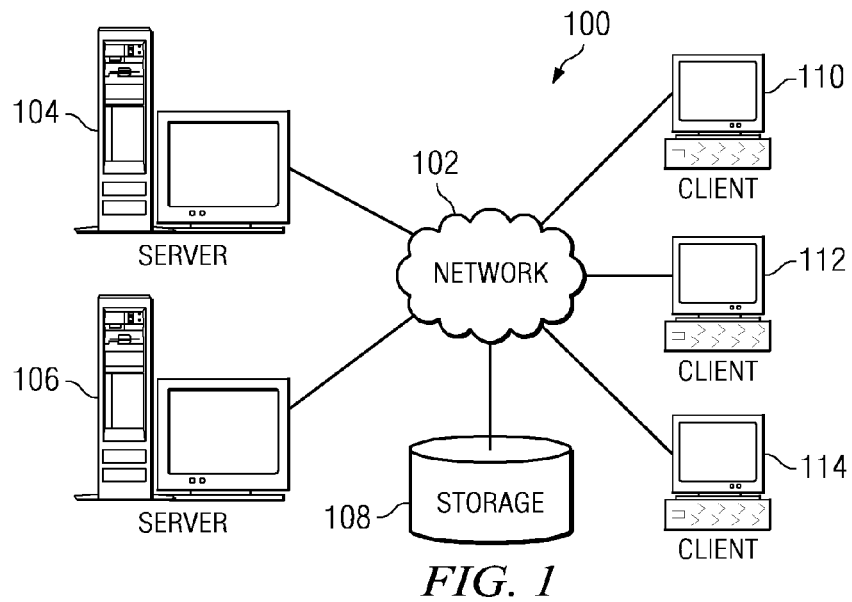
FIG. 1 is a pictorial representation of a network of data processing systems in which illustrative embodiments may be implemented.
Figure 2:
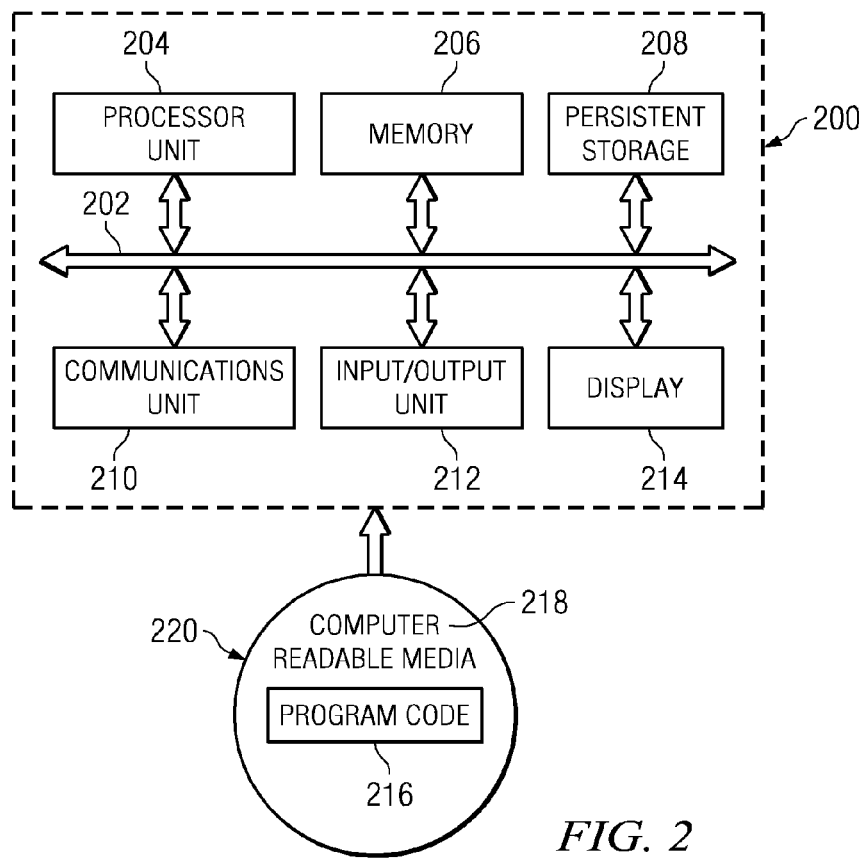
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Clients 110, 112, and 114 may be used to access a wiki stored on server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
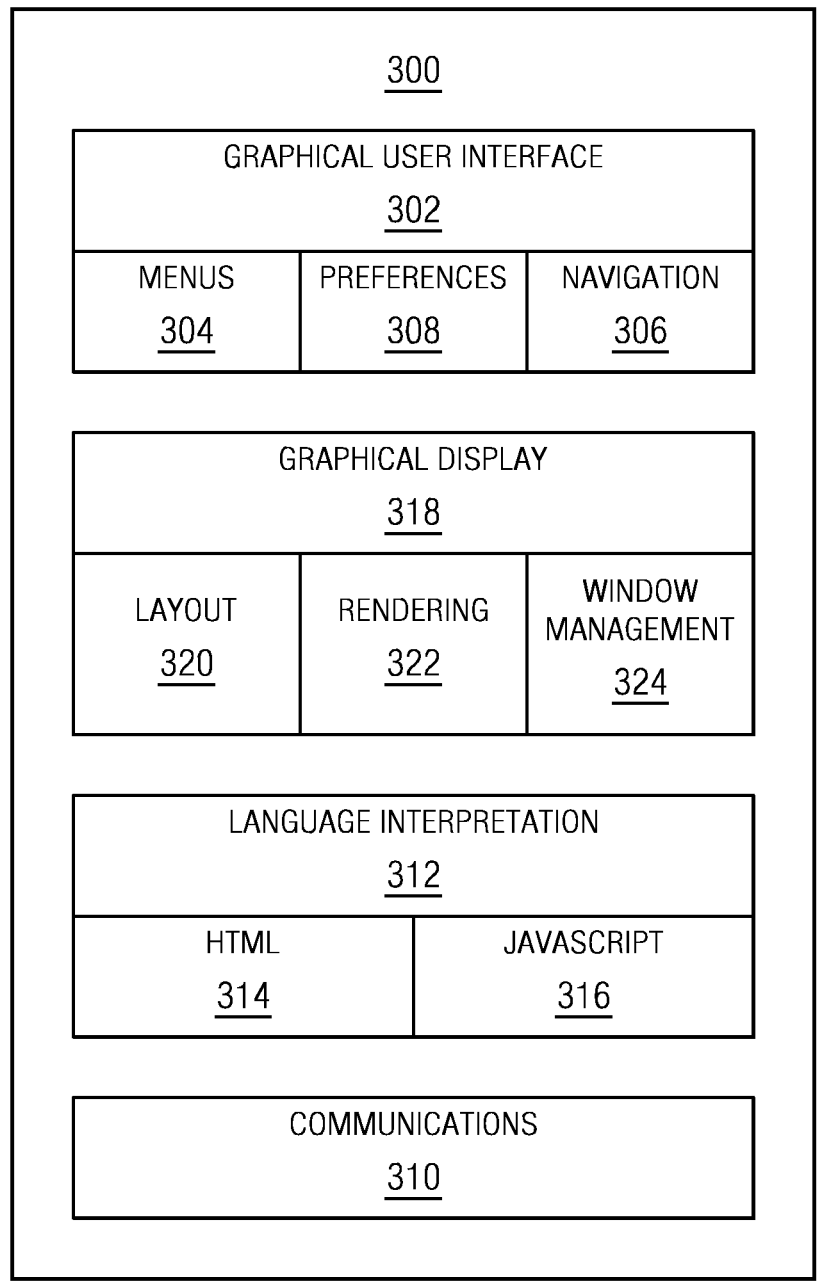
FIG. 3 is a block diagram of a browser program in accordance with an illustrative embodiment.

Turning next to FIG. 3, a block diagram of a browser program is depicted in accordance with an illustrative embodiment. A browser is an application used to navigate or view information or data in a distributed database, such as the Internet or the World Wide Web. Browser 300 can be executed on a data processing system, such as clients 110, 112, and 114 of FIG. 1. Browser 300 can be used to create and edit a wiki page using a simple markup language.

In this example, browser 300 includes graphical user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences, such as those illustrated in FIG. 3, may be set through preferences 308.

Communications 310 is the mechanism with which browser 300 receives documents and other resources from a network, such as the Internet. Further, communications 310 is used to send or upload documents and resources onto a network. In the depicted example, communications 310 uses hypertext transfer protocol (HTTP). Other protocols may be used depending on the implementation. Documents that are received by browser 300 are processed by language interpretation 312, which includes HTML 314 and JavaScript 316. Language interpretation 312 will process a document for presentation on graphical display 318. In particular, HTML statements are processed by HTML 314 for presentation, while JavaScript statements are processed by JavaScript unit 316.

Graphical display 318 includes layout 320, rendering 322, and window management 324. These units are involved in presenting web pages to a user based on results from language interpretation 312.

Browser 300 is presented as an example of a browser program in which illustrative embodiments may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as Mozilla Firefox or Microsoft Internet Explorer. Mozilla Firefox is available from Mozilla Corporation, while Microsoft Internet Explorer is available from Microsoft Corporation.

The illustrative embodiments provide a computer implemented method, apparatus, and computer program code for readily identifying authenticated content within a webpage having user customizable content. A wiki engine reads a wiki markup file containing user customizable content. The wiki engine determines a fingerprint of the user customizable content. The wiki engine then compares the determined fingerprint to an original fingerprint stored in a wiki signature block within the wiki markup file. The original fingerprint was created and stored at the time the user customizable content was digitally signed or authenticated.

The wiki engine then compares the determined fingerprint with the original fingerprint. If the two fingerprints are identical, the user customizable content is identified as unchanged, and thus any digital signature associated with the content is deemed still valid. This signed content is presented having a first appearance.

If the two fingerprints are not identical, the user customizable content is identified, and thus any digital signature associated with the content is deemed invalid. This unsigned content is presented having a second appearance. Unsigned content can include content having an invalid digital signature and content having no valid or invalid signatures. Alternatively, content having an invalid digital signature can also be graphically distinguishable from signed content and unsigned content by presenting invalid digital signatures in a third appearance.

Figure 4:
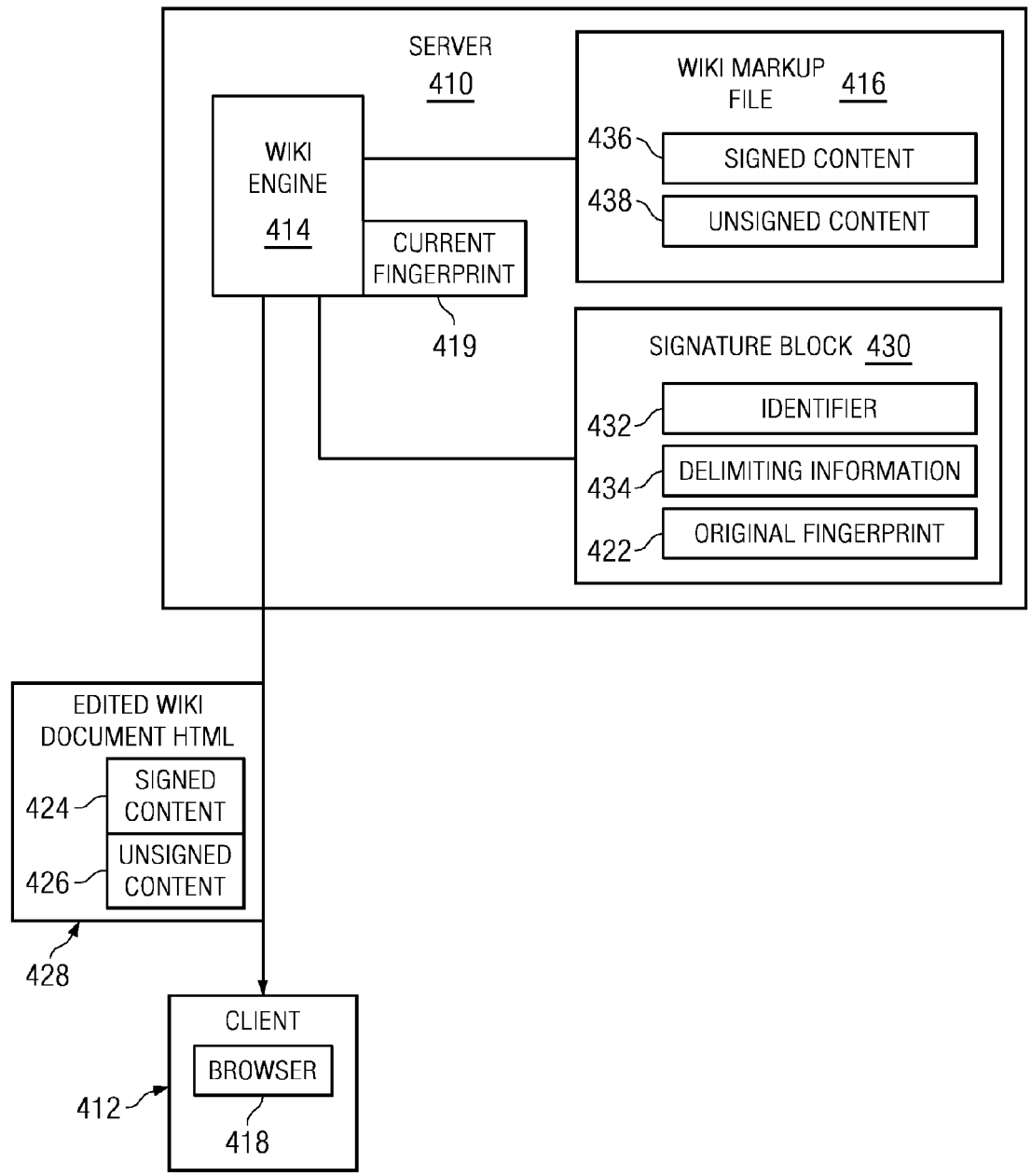
FIG. 4 is a diagram illustrating a data flow between system components delivering user customizable content in accordance with an illustrative embodiment.

Referring now to FIG. 4, a diagram illustrating a data flow between system components delivering user customizable content is depicted in accordance with an illustrative embodiment. Server 410 can be server 104, 106 in FIG. 1. Client 412 can be client 110, 112, and 114 of FIG. 1.

Server 410 executes wiki engine 414. Wiki engine 414 is the server-side software powering a wiki network site. Wiki engine 414 can be any publicly or commercially available wiki engine, including Java based wikis, such as JSPwiki or Lisp-based wikis, such as KLiki, .NET or Mono based wikis, such as FlexWiki, Perl based wikis, such as Quickywiki, Python based wikis, such as PikiePikie, and PHP based wikis, such as Tikiwiki, as well as wikis implemented in other programming languages.

Wiki markup file 416 is a data file or data structure containing information to be presented in the displayed wiki document. Wiki markup file 416 is written in a language that corresponds to, and is parsible by, Wiki engine 414.

Client 412 executes browser 418. Browser 418 is an application used to navigate or view information or data in a distributed database and is capable of retrieving wiki pages from the server 410. Browser 418 can be browser 300 of FIG. 3.

Wiki engine 414 receives a request from client 412 for a wiki page. A wiki page is a rendering of wiki markup file 416 that is viewable on browser 418. Responsive to receiving the request, wiki engine 414 identifies wiki markup file 416. Wiki markup file 416 corresponds to the requested wiki page. Wiki markup file 416 is a data file containing information to be presented in the requested wiki page. Wiki markup file 416 is written in a language that is parsible by wiki engine 414.

Responsive to identifying wiki markup file 416, wiki engine 414 parses wiki markup file 416 looking for signature block 430. The signature block 430 contains an identifier 432 that uniquely identifies the signer of the signed content 436. Signature block 430 also includes signed content delimiting information 434. Delimiting information 434 identifies signed content 436. Delimiting information 434 can identify signed content 436 by use of wiki markup tags. Signature block 430 also includes the original fingerprint 422 of the signed content, encrypted with the signer's private key.

Responsive to identifying wiki signature block 430, wiki engine 414 creates a current fingerprint 419 of wiki signed content 436. Current fingerprint 419 can be created by employing a hash function. The hash function is a transformation that takes wiki signed content 436 as input and returns a fixed-size string. This string, which is called the hash value, is current fingerprint 419. Current fingerprint 419 is therefore a concise representation of wiki signed content 436, at the time that a wiki page is requested by a client 412, from which current fingerprint 419 was computed.

Further responsive to identifying wiki signature block 430, wiki signature block 430 is used to determine the authenticity of information in wiki signed content 436. Wiki signature block 430 contains original fingerprint 422. Original fingerprint 422 was created at the time of signing or authenticating wiki signed content 436. Original fingerprint 422 was created by employing a corresponding or identical hash function that is used to create current fingerprint 419. Original fingerprint 422 is therefore a concise representation of wiki signed content 436, at the time of signing or authenticating wiki signed content 436, from which original fingerprint 422 was computed.

The wiki engine 414 retrieves the signer's public key from storage and decrypts the fingerprint. Wiki engine 414 then compares current fingerprint 419 with original fingerprint 422. If the current fingerprint 419 is identical to the original fingerprint 422, then wiki signed content 436 has not been changed since the time of signing or authenticating. Therefore, wiki signed content 436 in wiki markup file 416 associated with wiki signature block 430 is identified as signed content 424.

However, if the current fingerprint 419 is not identical to the original fingerprint 422, then either wiki signed content 436 has been changed since the time of signing or authenticating, or original fingerprint 422 has been changed since the time of signing or authenticating, or both wiki signed content 436 and original fingerprint 422 have been changed since the time of signing or authenticating. Therefore, wiki signed content 436 in wiki markup file 416 associated with wiki signature block 430 is either identified as unsigned content 426, or identified as modified content 430, at the discretion of wiki engine 414.

Wiki engine 414 then generates edited wiki document page 428 from signed content 424 and unsigned content 426. Wiki engine 414 generates edited wiki document page 428 such that signed content 424 is visibly distinct from unsigned content 426. Signed content 424 is visibly distinct from unsigned content 426 by presenting signed content 424 in a different font, font size, font color, or background color than the font, font size, font color, or background color in which unsigned content 426 is presented.

Wiki engine 414 can indicate the visible distinction by inserting a tag or other metadata instructions to the client regarding the signed content 424 and unsigned content 426.

In another illustrative embodiment, wiki engine 414 can indicate the visible distinction between signed content 424 and unsigned content 426 by altering the markup language code to indicate a different font, font size, font color, or background color that should be used for signed content 424 than the font, font size, font color, or background color used for unsigned content 426.

Edited wiki document page 428 is presented at client 412 on browser 418. Edited wiki document page 428 is presented such that signed content 424 is visibly distinct from unsigned content 426. Signed content 424 is visibly distinct from unsigned content 426 by presenting signed content 424 in a different font, font size, font color, or background color than the font, font size, font color, or background color in which unsigned content 426 is presented.

Figures 5, 6:
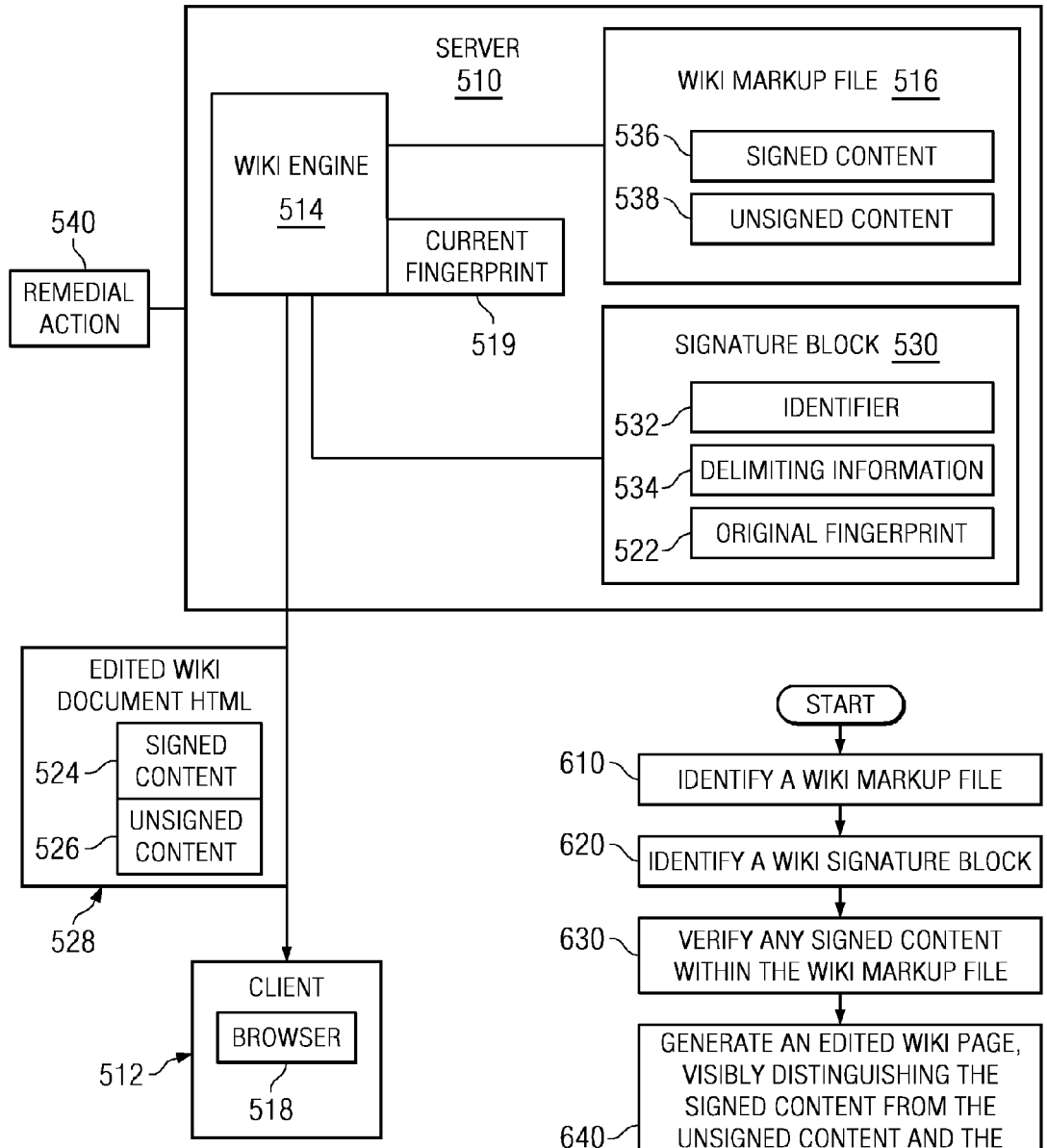
FIG. 5 is a diagram illustrating a data flow between system components delivering user customizable content in accordance with an illustrative embodiment.
FIG. 6 is a flowchart of a process for readily identifying authenticated content within a webpage having user customizable content in accordance with an illustrative embodiment.

Referring now to FIG. 5, a diagram illustrating data flow between system components delivering user customizable content is depicted in accordance with an illustrative embodiment. The system and components illustrated in FIG. 5 are the system and components illustrated in FIG. 4. Server 510 can be server 104, 106 in FIG. 1. Client 512 can be client 110, 112, and 114 of FIG. 1. Wiki engine 514 illustrates an alternative illustrative embodiment wherein attempted alteration of signed content 524 would initiate one or more remedial action 540.

Client 512 uses browser 518 to view signed content 524 within edited wiki document page 528. Responsive to an attempted alteration of signed content 524, wiki engine 514 may initiate remedial action 540.

Remedial action 540 is an action taken by the wiki engine in response to the attempted alteration of signed content 524. Remedial action 540 can be a disallowance of the attempted alteration of signed content 524. Remedial action 540 can be a verification of an identity of the user attempting to change the signed content 524. The attempted alteration may be allowed only if the user is authorized to make changes to signed content 524.

Remedial action 540 may also be a notification, such as an e-mail message, to a system administrator or other interested party that a signed content 524 has been altered. The system administrator could then decide whether to accept the alteration without signing it, accept and adopt the alteration by signing the alteration, or to reject the alteration and revert the altered content to the unaltered signed content 524.

Referring now to FIG. 6, a flowchart of a process for readily identifying authenticated content within a webpage having user customizable content is depicted in accordance with an illustrative embodiment. Process 600 is a software process executing on a software component, such as wiki engine 414 of FIG. 4.

Process 600 begins by identifying a wiki markup file (step 610), such as wiki markup file 416 of FIG. 4. The wiki markup file corresponds to a wiki page requested by a user. The wiki markup file is a data file containing information to be presented in the requested wiki page. The wiki markup file is written in a language that is parsible by the wiki engine.

Process 600 next identifies a wiki signature block (step 620). The wiki signature block is used to determine the authenticity of information in the wiki markup file. The wiki signature block contains an indication of any signed content within the wiki markup file.

Responsive to identifying the wiki markup file and the wiki signature block, process 600 verifies any signed content within the wiki markup file (step 630). That is, the wiki engine determines whether the current content of the wiki markup file is identical to previously authenticated, signed content.

Responsive to verifying any signed content within the wiki markup file, process 600 generates an edited wiki page, visibly distinguishing the signed content from the unsigned content and the broken signature content (step 640). The signed content can be visibly distinct from the unsigned content by presenting the signed content in a different font, font size, font color, or background color than the font, font size, font color, or background color in which the unsigned content is presented. Process 600 typically generates the edited wiki page in a markup language format, such as HTML that is displayable within a browser.

The broken signature content can be visibly distinct from the signed and unsigned content by presenting the broken signature content in a different font, font size, font color, or background color than the font, font size, font color, or background color in which the signed and unsigned content is presented. Process 600 typically generates the edited wiki page in a markup language format, such as HTML that is displayable within a browser.

Process 600 then sends the edited wiki page to the client for display on the browser (step 650), with the process terminating thereafter.

Figure 7:
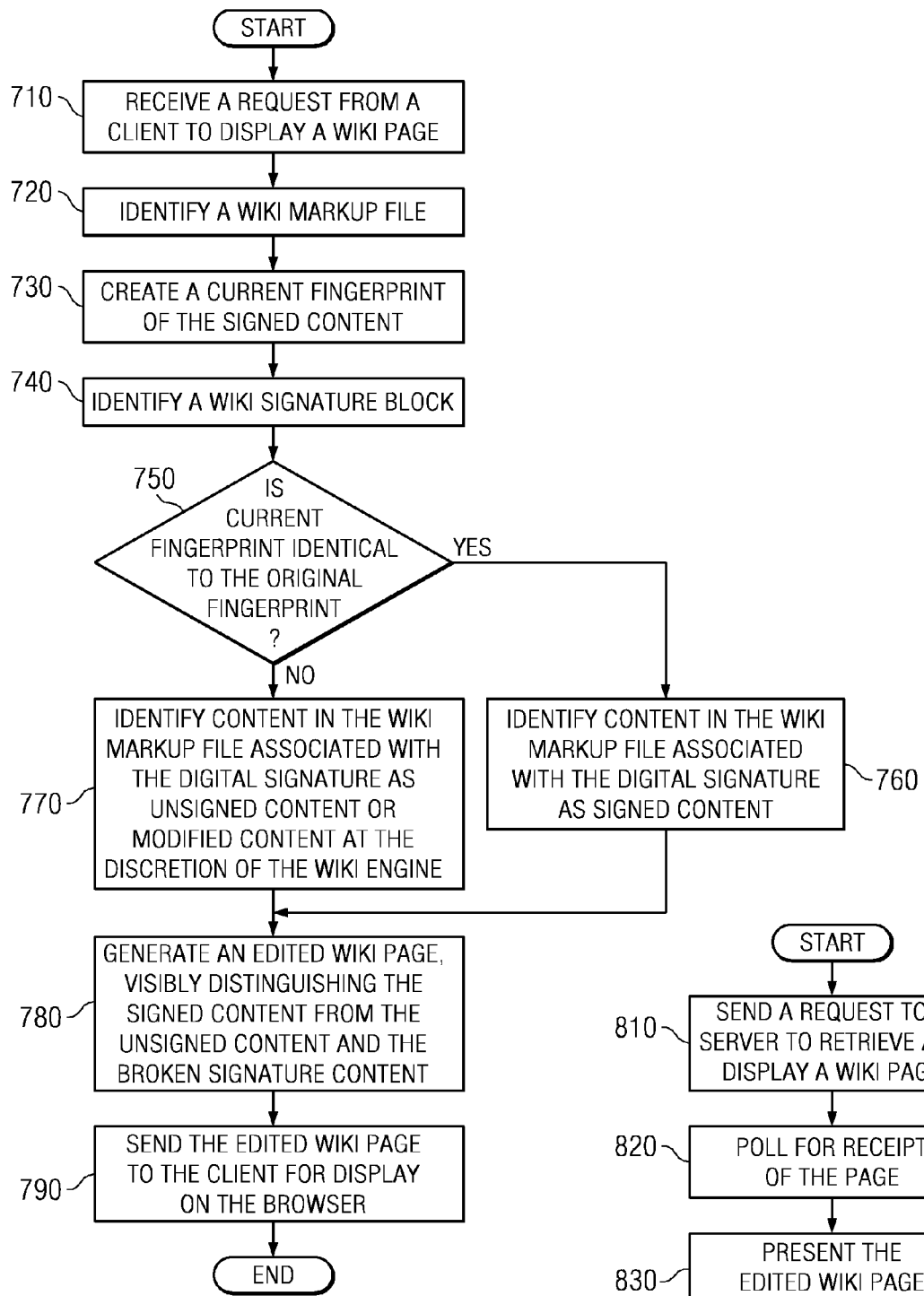
FIG. 7 is a flowchart of a process for readily identifying authenticated content within a webpage having user customizable content in accordance with an illustrative embodiment.

Referring now to FIG. 7, a flowchart of a process for readily identifying authenticated content within a webpage having user customizable content is depicted in accordance with an illustrative embodiment. Process 700 is a software process executing on a software component, such as wiki engine 414 of FIG. 4. Process 700 is a more detailed illustration of Process 600 of FIG. 6.

Process 700 begins by receiving a request from a client to display a wiki page (step 710). Responsive to receiving the request, process 700 identifies a wiki markup file (step 720), such as wiki markup file 416 of FIG. 4. The wiki markup file corresponds to a wiki page requested by a user. The wiki markup file is a data file containing information to be presented in the requested wiki page. The wiki markup file is written in a language that is parsible by the wiki engine.

Responsive to identifying the wiki markup file, the wiki engine parses the wiki markup file looking for a wiki signature block. The signature block contains an identifier that uniquely identifies the person who signed the wiki markup file. The signature block also includes signed content delimiting information. The delimiting information identifies the signed content. The delimiting information can identify the signed content by use of wiki markup tags. The signature block also includes the original fingerprint of the signed content, encrypted with the signer's private key.

Responsive to identifying the wiki markup file, process 700 creates a current fingerprint of the signed content in the wiki markup file (step 730). The current fingerprint can be created by employing a hash function. The hash function is a transformation that takes the wiki signed content as input and returns a fixed-size string. This string, which is called the hash value, is the current fingerprint. The current fingerprint is a concise representation of the wiki signed content, at the time that the wiki page is requested by the client, from which the current fingerprint was computed.

Further, responsive to receiving the request from the client, process 700 identifies a wiki signature block (step 740). The wiki signature block is used to determine the authenticity of information in the wiki signed content. The wiki signature block contains an original fingerprint of the wiki signed content. The original fingerprint was created at the time of signing or authenticating the wiki signed content. The original fingerprint was created by employing a corresponding or identical hash function to the one used to create the current fingerprint. The original fingerprint is therefore a concise representation of the wiki signed content, at the time of signing or authenticating the wiki signed content, from which the original fingerprint was computed.

Responsive to creating the current fingerprint and identifying the wiki signature block, process 700 compares the current fingerprint with the original fingerprint, determining whether the current fingerprint is identical to the original fingerprint (step 750). If the current fingerprint is identical to the original fingerprint ("yes" at step 750), the wiki signed content has not been changed since the time of signing or authenticating the wiki signed content. Therefore, process 700 identifies content in the wiki markup file associated with the wiki signature block as signed content (step 760).

If the current fingerprint is not identical to the original fingerprint ("no" at step 750), the wiki signed content has been changed since the time of signing or authenticating the wiki signed content, the original fingerprint has been changed since the time of signing or authenticating the wiki signed content, or both the wiki signed content and the original fingerprint has been changed since the time of signing or authenticating the wiki signed content. The digital signature is therefore not authenticated. Because the digital signature was not authenticated, process 700 identifies content in the wiki markup file associated with the digital signature as unsigned content or modified content, at the discretion of the wiki engine (step 770). Unsigned content may also include content having an invalid digital signature, and content having no valid or invalid signatures.

Process 700 generates an edited wiki page, visibly distinguishing the signed content from the unsigned content and the broken signature content (step 780). The signed content can be visibly distinct from the unsigned content by presenting the signed content in a different font, font size, font color, or background color than the font, font size, font color, or background color in which the unsigned content is presented. Process 700 typically generates the edited wiki page in a markup language format, such as HTML that is displayable within a browser.

Process 700 can indicate the visible distinction by inserting a tag or other metadata instructions to the client regarding the signed content and the unsigned content. The tag or other metadata instructions can be delimiting information 434 of FIG. 4. The tag or other metadata instructions can be derived from delimiting information 434 of FIG. 4. The tag or other metadata instructions can be wiki markup tags.

In another illustrative embodiment, process 700 can indicate the visible distinction between the signed content and the unsigned content by altering the markup language code to indicate a different font, font size, font color, or background color that should be used for the signed content that the font, font size, font color, or background color used for the unsigned content.

Process 700 then sends the edited wiki page to the client for display on the browser (step 790), with the process terminating thereafter.

Figure 8:
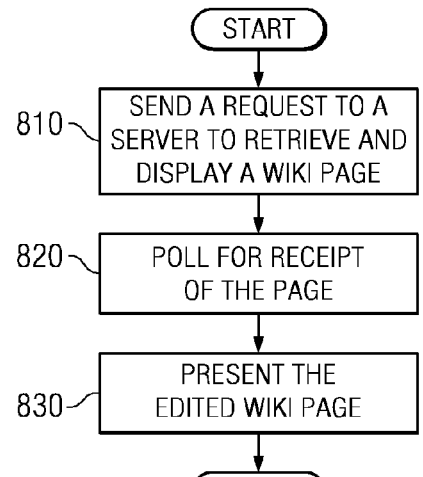
FIG. 8 is a flowchart of a process for readily displaying authenticated content within a webpage having user customizable content in accordance with an illustrative embodiment.

Referring now to FIG. 8, a flowchart of a process for readily displaying authenticated content within a webpage having user customizable content is depicted in accordance with an illustrative embodiment. Process 800 is a software process executing on a software component, such as browser 418 of FIG. 4.

Process 800 begins by sending a request to a server to retrieve and display a wiki page (step 810). Process 800 then polls for receipt of the page (step 820).

Process 800 receives an edited wiki page from the server (step 820). Responsive to receiving the edited web page, process 800 displays the edited wiki page (step 830), with the process terminating thereafter.

The edited web page visibly distinguishes the signed content from the unsigned content. The signed content can be visibly distinct from the unsigned content by presenting the signed content in a different font, font size, font color, or background color than the font, font size, font color, or background color in which the unsigned content is presented. The edited wiki page is typically generated by the server in a markup language format, such as HTML that is displayable by process 800.

The visible distinction can be indicated by a tag or other metadata instructions inserted into the edited wiki page. The tag or other metadata instructions identify the signed content and the unsigned content. In another illustrative embodiment, the visible distinction between the signed content and the unsigned content can be indicated by process 800 determining an alteration of the markup language code to indicate a different font, font size, font color, or background color that should be used for the signed content that the font, font size, font color, or background color used for the unsigned content.

Thus, the illustrative embodiments provide a computer implemented method, apparatus, and computer program code for readily identifying authenticated content within a webpage having user customizable content. A wiki engine reads a wiki markup file containing user customizable content. The wiki engine determines a fingerprint of the user customizable content. The wiki engine then compares the determined fingerprint to an original fingerprint stored in a wiki markup file. The original fingerprint was created and stored at the time the user customizable content was digitally signed or authenticated.

The wiki engine then compares the determined fingerprint with the original fingerprint. If the two fingerprints are identical, the user customizable content is identified as unchanged, and thus any digital signature associated with the content is deemed still valid. This signed content is presented having a first appearance.

If the two fingerprints are not identical, the user customizable content is identified as unsigned or modified, and thus any digital signature associated with the unsigned or modified content is deemed invalid. This invalid content is presented having a second appearance. Unsigned content can include content having an invalid digital signature, and content having no valid or invalid signatures.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for readily identifying authenticated content within a document having user customizable content, the computer implemented method comprising:

receiving a request to display a wiki page;

responsive to receiving the request, identifying a wiki markup file, wherein the wiki markup file contains signed content and unsigned content;

responsive to receiving the request, identifying a wiki signature block within the wiki markup file, wherein the wiki signature block identifies the signed content within the wiki markup file;

responsive to identifying signed content within the wiki markup file, verifying the signed content is associated with a valid digital signature;

responsive to verifying the signed content is associated with the valid digital signature, generating an edited wiki page from the signed content and the unsigned content, wherein the signed content associated with the valid digital signature is presented having a first appearance, wherein the signed content associated with the valid digital signature is visibly distinguished from the unsigned content in the edited wiki page, the unsigned content being presented having a second appearance;

responsive to verifying the signed content is associated with an invalid digital signature, generating the edited wiki page from the signed content and the unsigned content, wherein the signed content associated with the invalid digital signature is presented having a third appearance, wherein the signed content associated with the invalid digital signature is visibly distinguished from the signed content associated with the valid digital signature and the unsigned content in the edited wiki page; and displaying the edited wiki page containing the signed content using the first appearance, the signed content associated with the invalid digital signature using the third appearance and the unsigned content using the second appearance.

2. The computer implemented method of claim 1, wherein the signed content comprises an original fingerprint, and wherein the step of verifying the signed content comprises:
creating a current fingerprint of the signed content; and
comparing the current fingerprint with the original fingerprint.

3. The computer implemented method of claim 2, wherein the original fingerprint was created at a first time at which the wiki markup file was signed, the method further comprising:
responsive to receiving the request, creating the current fingerprint.

4. The computer implemented method of claim 1, wherein the step of generating the edited wiki page from the signed content and the unsigned content, wherein the signed content is visibly distinguishable from the unsigned content in the edited wiki page comprises visibly distinguishing the signed content from the unsigned content with at least one of a different font, a different font size, a different font color, and a different background color.

5. The computer implemented method of claim 1 further comprising:
receiving an attempted alteration of the wiki markup file;
determining if the attempted alteration is an alteration of the signed content;
responsive to determining that the attempted alteration is an alteration of the signed content, determining whether the user is authorized to make changes to the signed content; and
responsive to determining that the user is authorized to make changes to the signed content, allowing the attempted alteration.

6. The computer implemented method of claim 5 further comprising:
responsive to determining that the attempted alteration is not an alteration of the signed content, allowing the attempted alteration.

7. The computer implemented method of claim 5 further comprising:
responsive to determining that the user is not authorized to make changes to the signed content, disallowing the attempted alteration.

8. A computer program product for readily identifying authenticated content within a document having user customizable content, the computer program product comprising:
a computer readable storage device having computer usable program code stored thereon, the computer usable program code comprising:
computer usable program code for receiving a request to display a wiki page;
computer usable program code, responsive to receiving the request, for identifying a wiki markup file, wherein the wiki markup file contains signed content and unsigned content;
computer usable program code, further responsive to receiving the request, for identifying a wiki signature block within the wiki markup file, wherein the wiki signature block identifies the signed content within the wiki markup file;
computer usable program code, responsive to identifying signed content within the wiki markup file, for verifying the signed content is associated with a valid digital signature;
computer usable program code, responsive to verifying the signed content is associated with the valid digital signature, for generating an edited wiki page from the signed content and the unsigned content, wherein the signed content associated with the valid digital signature is presented having a first appearance, wherein the signed content associated with the valid digital signature is visibly distinguished from the unsigned content in the edited wiki page, the unsigned content being presented having a second appearance;
computer usable program code, responsive to verifying the signed content is associated with an invalid digital signature, for generating the edited wiki page from the signed content and the unsigned content, wherein the signed content associated with the invalid digital signature is presented having a third appearance, wherein the signed content associated with the invalid digital signature is visibly distinguished from the signed content associated with the valid digital signature and the unsigned content in the edited wiki page; and
computer usable program code for displaying the wiki page containing the signed content using the first appearance, the signed content associated with the invalid digital signature using the third appearance and the unsigned content using the second appearance.

9. The computer program product of claim 8, wherein the signed content comprises an original fingerprint of the signed content, and wherein the computer usable program code for verifying the signed content comprises:
computer usable program code for creating a current fingerprint of the signed content; and
computer usable program code for comparing the current fingerprint with the original fingerprint.

10. The computer program product of claim 9, wherein the original fingerprint was created at a first time at which the wiki markup file was signed, the computer usable program code further comprising:
computer usable program code, responsive to receiving the request, for creating the current fingerprint.

11. The computer program product of claim 8, wherein the computer usable program code for generating an edited wiki page from the signed content and the unsigned content, wherein the signed content is visibly distinguished from the unsigned content in the edited wiki page, further comprises computer usable program code for presenting the signed content and the unsigned content with at least one of a different font, a different font size, a different font color, and a different background color.

12. The computer program product of claim 8 further comprising:
computer usable program code for receiving an attempted alteration of the wiki markup file;
computer usable program code for determining if the attempted alteration is an alteration of the signed content;
computer usable program code, responsive to determining that the attempted alteration is an alteration of the signed content, for determining whether the user is authorized to make changes to the signed content; and
computer usable program code, responsive to determining that the user is authorized to make changes to the signed content, for allowing the attempted alteration.

13. The computer program product of claim 12 further comprising:
    computer usable program code, responsive to determining that the attempted alteration is not an alteration of the signed content, for allowing the attempted alteration.

14. The computer program product of claim 12 further comprising:
    computer usable program code, responsive to determining that the user is not authorized to make changes to the signed content, for disallowing the attempted alteration.

15. A data processing system comprising:
    a bus;
    a communications unit connected to the bus;
    a storage device connected to the bus, wherein the storage device includes computer usable program code; and
    a processor unit connected to the bus, wherein the processor unit executes the computer usable program code to direct the data processing system to:
    receive a request to display a wiki page,
    responsive to receiving the request, identify a wiki markup file, wherein the wiki markup file contains signed content and unsigned content,
    further responsive to receiving the request, identify a wiki signature block within the wiki markup file, wherein the wiki signature block identifies the signed content within the wiki markup file,
    responsive to identifying signed content within the wiki markup file, verify the signed content is associated with a valid digital signature,
    responsive to verifying the signed content is associated with the valid digital signature, generate an edited wiki page from the signed content and the unsigned content, wherein the signed content associated with the valid digital signature is presented having a first appearance, wherein the signed content associated with the valid digital signature is visibly distinguished from the unsigned content in the edited wiki page, the unsigned content being presented having a second appearance;
    responsive to verifying the signed content is associated with an invalid digital signature, generate the edited wiki page from the signed content and the unsigned content, wherein the signed content associated with the invalid digital signature is presented having a third appearance, wherein the signed content associated with the invalid digital signature is visibly distinguished from the signed content associated with the valid digital signature and the unsigned content in the edited wiki page; and
    display the edited wiki page containing the signed content using the first appearance, the signed content associated with the invalid digital signature using the third appearance and the unsigned content using the second appearance.

16. The data processing system of claim 15, wherein the signed content comprises an original fingerprint of the wiki markup file, and wherein the processor unit executing the computer usable program code to verify the signed content comprises:
    the processor unit executing the computer usable program code to create a current fingerprint of the signed content; and
    the processor unit executing the computer usable program code to compare the current fingerprint with the original fingerprint.

17. The data processing system of claim 16, wherein the original fingerprint was created at a first time at which the wiki markup file was signed, the processor unit further executing computer usable program code, responsive to receiving the request, to create the current fingerprint.

18. The data processing system of claim 15, wherein the processor unit further executes the computer usable program code to direct the data processing system:
    to receive an attempted alteration of the wiki markup file;
    to determine if the attempted alteration is an alteration of the signed content;
    responsive to determining that the attempted alteration is an alteration of the signed content, to determine whether the user is authorized to make changes to the signed content; and
    responsive to determining that the user is authorized to make changes to the signed content, to allow the attempted alteration.

19. The data processing system of claim 18, wherein the processor unit further executes the computer usable program code to direct the data processing system:
    responsive to determining that the attempted alteration is not an alteration of the signed content, to allow the attempted alteration.

20. The data processing system of claim 18, wherein the processor unit further executes the computer usable program code to direct the data processing system:
    responsive to determining that the user is not authorized to make changes to the signed content, to disallow the attempted alteration.

* * * * *